US010987712B2

(12) United States Patent
Maini et al.

(10) Patent No.: US 10,987,712 B2
(45) Date of Patent: Apr. 27, 2021

(54) TUBULAR ELEMENT TO TRANSFER ABRASIVE MATERIALS, IN PARTICULAR CONCRETE, AND METHOD TO MAKE IT

(71) Applicant: VALME S.R.L.—UNICO SOCIO, Rogolo (IT)

(72) Inventors: Paolo Dario Maini, Lissone (IT); Luca Soggetto, Como (IT)

(73) Assignee: VALME S.R.L.—UNICO SOCIO, Rogolo (IT)

( * ) Notice: Subject to any disclaimer, the term of this patent is extended or adjusted under 35 U.S.C. 154(b) by 0 days.

(21) Appl. No.: 16/365,055

(22) Filed: Mar. 26, 2019

(65) Prior Publication Data

US 2019/0291155 A1 Sep. 26, 2019

(30) Foreign Application Priority Data

Mar. 26, 2018 (IT) ........................ 102018000003964

(51) Int. Cl.

| | |
|---|---|
| ***B22D 13/02*** | (2006.01) |
| ***B22D 19/08*** | (2006.01) |
| ***B21C 37/15*** | (2006.01) |
| ***B65G 53/52*** | (2006.01) |
| ***F16L 9/18*** | (2006.01) |
| ***F16L 57/06*** | (2006.01) |
| ***B22D 13/10*** | (2006.01) |
| ***C22C 29/06*** | (2006.01) |
| ***F16L 9/14*** | (2006.01) |
| *B65G 53/32* | (2006.01) |
| *F16L 9/10* | (2006.01) |

(52) U.S. Cl.

CPC .......... *B21C 37/154* (2013.01); *B22D 13/023* (2013.01); *B22D 13/102* (2013.01); *B22D 19/08* (2013.01); *B65G 53/523* (2013.01); *C22C 29/06* (2013.01); *F16L 9/14* (2013.01); *F16L 9/18* (2013.01); *F16L 57/06* (2013.01); *B65G 53/32* (2013.01); *F16L 9/10* (2013.01)

(58) Field of Classification Search

CPC ...... B22D 13/02; B22D 13/023; B22D 19/08; B21C 37/15; B21C 37/154; B65G 53/32; B65G 53/52; B65G 53/523; C22C 29/06; F16L 9/10; F16L 9/14; F16L 9/18; F16L 57/06

USPC ........................................................ 164/114

See application file for complete search history.

(56) References Cited

U.S. PATENT DOCUMENTS 4,357,394 A * 11/1982 Khandros .............. B22D 13/02 138/143
5,275,440 A 1/1994 Esser (Continued)

FOREIGN PATENT DOCUMENTS

CN 102278550 A 12/2011
WO 2012017286 A1 2/2012

(Continued)

*Primary Examiner* — Kevin P Kerns
(74) *Attorney, Agent, or Firm* — Cantor Colburn LLP

(57) ABSTRACT

A method to make a tubular element to transfer abrasive materials such as concrete, inert materials or suchlike, where the tubular element includes an external tubular component made of steel and an internal tubular component, coaxial to the external tubular component, where the internal tubular component is made of chromium carbide, or other similar material resistant to wear.

10 Claims, 1 Drawing Sheet

(56) References Cited

U.S. PATENT DOCUMENTS

| | | | | |
|---|---|---|---|---|
| 5,819,838 | A * | 10/1998 | De Vylder et al. .... | B22D 19/06<br>164/105 |
| 6,467,812 | B1 | 10/2002 | Klemm | |
| 8,261,767 | B1 * | 9/2012 | Blume .................... | C22C 29/06<br>137/375 |
| 9,429,287 | B2 | 8/2016 | Dunn | |
| 2002/0005222 | A1 | 1/2002 | Esser | |
| 2003/0127857 | A1 | 7/2003 | Boyd | |
| 2008/0174110 | A1 | 7/2008 | Olson | |
| 2009/0115186 | A1 | 5/2009 | Esser | |
| 2009/0308480 | A1 | 12/2009 | Esser | |
| 2011/0259251 | A1 | 10/2011 | Little | |
| 2013/0126033 | A1 | 5/2013 | Cipolla | |
| 2014/0096858 | A1 | 4/2014 | Nam | |
| 2014/0283942 | A1 | 9/2014 | Ferre | |
| 2017/0203368 | A1 | 7/2017 | Maderud | |
| 2018/0072513 | A1 | 3/2018 | Ferre | |

FOREIGN PATENT DOCUMENTS

| | | | |
|---|---|---|---|
| WO | 2013004018 | A1 | 1/2013 |
| WO | 2013182884 | A1 | 12/2013 |
| WO | 201615130 | a | 9/2016 |

* cited by examiner

TUBULAR ELEMENT TO TRANSFER ABRASIVE MATERIALS, IN PARTICULAR CONCRETE, AND METHOD TO MAKE IT

CROSS REFERENCE TO RELATED APPLICATION

This application is related to and claims the benefit of Italian Patent Application Number 102018000003964 filed on Mar. 26, 2018, the contents of which are herein incorporated by reference in their entirety.

TECHNICAL FIELD

The present disclosure concerns a tubular element to transfer abrasive materials, in particular concrete, as well as a method to make said tubular element. One of the fields of application of the present disclosure is the construction industry, and in particular for transporting construction materials, such as for example inert materials, or concrete, for truck-mounted pumps, irrespective of the fact that the present disclosure can also be used in other industrial sectors in which tubular elements are required which have at least their internal surface with a high degree of hardness and resistance to abrasion.

BACKGROUND

In the field of construction in its widest sense the use of modular tubular elements is known, which are connected together to make a pipe that allows to transfer construction materials, such as for example concrete, inert materials, or suchlike, which are very abrasive, from a container, such as for example a cement mixer truck, to a casting zone, by means of pumping devices.

Known pipes normally consist of one or more tubular elements, or segments, rectilinear and/or curved, connected together in sequence by means of tubular joints, or connection elements, which have standardized angles of longitudinal development, such as for example 15°, 30°, 45°, 60° or 90°.

The tubular elements are subjected to an action of abrasion of their internal surfaces, mainly due to the action that the transported material exerts on said internal surfaces, especially in the case of curved elements, in the part that during use is on the outside of the curve, that is, along the extrados.

Normally, each tubular element comprises an external tubular component, which defines the external layer, and an internal tubular component, coaxial with the external tubular component and which defines the internal layer.

The function of the internal tubular component is to resist wear and it is made, for example, of tempered steel, for example C60. The function of the external tubular component, on the other hand, is to mechanically resist internal pressure and protect the internal tempered part from the impacts that can occur during normal use. It is made, for example, of common carbon steel, for example non-tempered steel S355. Furthermore, the tubular element in question, consisting of an internal tubular component and an external tubular component, must be sized to withstand an internal working pressure, therefore continuous, typically equal to 85 bar.

The method to make a tubular element of this type requires multiple steps known in the state of the art, amongst which the most significant in terms of costs and time is certainly the tempering step. In fact, this is performed by heating and cooling the two coaxial tubular components together, which constitute the tubular element, so that, due to the type of materials with which they are made, only the internal tubular component is tempered, while the external one is not.

The internal tubular component, once tempered, is extremely fragile, therefore the presence is necessary of the external tubular component which, on the contrary, not being tempered, remains ductile.

Given the extreme fragility of the internal tubular component, a very important aspect that determines the quality of the final product is the degree of coupling between the internal and external tubular components. The precision of the coupling, in fact, determines the maximum working pressure of the product obtained.

The joining of the two tubular components normally takes place in a step, called flaring, which precedes the tempering step. The flaring occurs by means of the mechanical deformation of the internal tubular component, by means of a punch that deforms it and thrusts it against the internal wall of the external tubular component.

Therefore, normally, the flaring step entails a plastic deformation of the internal tubular component against the external tubular component. As an alternative, it is known to deform the external tubular component using a matrix, that is, by simultaneously thrusting the two tubular components inside a cone, crushing the external wall on the inside before tempering.

Methods are also known which are able to obtain the same result by plastically deforming the external tubular component against the internal one.

The extent of the contact pressure between the two tubular components, due to various factors, such as the original ovalization of the unworked tubular components, the imperfect concentricity of the two tubular components and the local deformations, can lead to an incorrect adhesion of the two tubular components.

The known method to make a complete tubular element is therefore very complex and expensive, as multiple processes are provided, some of which, such as tempering, are relatively critical for the repeatability of the production process.

The Applicant's international patent application WO-A-2016/151370 discloses a method and an apparatus to make a tubular segment comprising obtaining an external tubular element and an internal tubular element made of a material with a resistance to wear greater than that of the external tubular element, and with a cross-section that covers at least part of the internal surface of the external tubular element. This known document also provides to insert the internal tubular element inside the external tubular element, after the latter is heated by means of a pre-heating system which uses a suitably sized furnace or inductor. Furthermore, in order to shape the external tubular element on the exact geometry of the internal tubular element, the use of a molding unit and a cooling unit is provided, to obtain a tubular segment without empty spaces between the external tubular element and the internal tubular element. However, this known method, although effective and reliable, is complex and requires long execution times.

A method to make a curved tubular joint is also known from document WO-A-2012/017286, which comprises the use of a curved anti-wear insert which, during use, is disposed inside the curved tubular element and through which the abrasive material to be transferred passes. During the production of the curved tubular joint, the curved anti-wear insert is disposed inside a mold and molten steel is cast around its peripheral surface to produce an external jacket which, once solidified, forms the external part of the tubular joint. However, this method to is complex and requires long execution times.

CN 102 278 550 describes a pipe to transfer concrete comprising an internal anti-wear layer and an external layer resistant to impacts. WO 2013/004018 also describes a pipe to transfer concrete comprising an internal anti-wear layer and an external layer resistant to impacts.

One purpose of the present disclosure is to provide a tubular element to convey construction materials, such as for example concrete or other abrasive materials in a fluid state, which is reliable and maintains its resistance to wear for a long time, and which is also simple to produce, relatively light and economical.

Another purpose of the present disclosure is to perfect a method to produce a tubular element to transfer abrasive materials, for example concrete, or other abrasive materials, which is relatively simple, economical and fast in terms of execution time.

The Applicant has devised, tested and embodied the present disclosure to overcome the shortcomings of the state of the art and to obtain these and other purposes and advantages.

BRIEF SUMMARY

In accordance with the above purposes, a tubular element to transfer abrasive materials, such as concrete, inert materials, or suchlike, according to the present disclosure, comprises an external tubular component made of steel and an internal tubular component made of a material with a resistance to wear greater than that of the external tubular component, in which the two tubular components, external and internal, are coaxial to a central axis.

The internal tubular component is made of a material with high characteristics of resistance to wear, as it is subject to the continuous sliding of the concrete during activity. The external tubular component is instead made of a material with high characteristics of resistance to impacts. According to one characteristic of the present disclosure, the material of which said internal tubular component is made comprises chromium carbide, in pure form or in the form of an alloy or a mixture thereof, deposited in a melted condition on the internal surface of the external tubular steel component.

According to another characteristic of the present disclosure, the method to make the tubular element comprises a first sub-step in which said external tubular component is made to rotate around said central axis at a determinate angular speed, and a second sub-step, simultaneous to the first sub-step, in which material comprising chromium carbide is cast into said external tubular component made to rotate, in a melted condition in order to make said internal tubular component, so that said tubular element is made substantially in a single working step.

According to another characteristic of the present disclosure, the material comprising chromium carbide is conveyed toward the internal surface of said external tubular component by distribution means, for example comprising a chute, while a relative translation is produced between said external tubular component and the distribution means in a direction parallel to said central axis.

According to another characteristic of the present disclosure, said determinate angular speed is advantageously comprised between about 200 rpm and about 250 rpm.

According to another characteristic of the present disclosure, said translation occurs at a determinate translation speed advantageously comprised between about 7 m/min and about 11 m/min.

According to another characteristic of the present disclosure, the temperature of said material comprising chromium carbide, when it comes into contact with said internal surface of said external tubular component, is advantageously comprised between about 1,950° C. and about 2,000° C. This temperature allows to melt the surface of the external tubular component, obtaining a consequent integration of the two materials. In fact, during the solidification of the material comprising chromium carbide, an interface is created in the contact layer between the two materials which allows the perfect adhesion of the two layers, as the internal component literally conforms according to the geometry of the external component.

This interface is characterized by the dispersion of the material comprising chromium carbide inside the external steel tube, and the thickness of said interface layer can vary between 0.2 mm and 0.4 mm.

According to another characteristic of the present disclosure, said external tubular component, at least during the first sub-step, is heated by external heating means so that it reaches and maintains a temperature advantageously comprised between about 1,000° C. and about 1,100° C.

According to another characteristic of the present disclosure, in a zone of said external tubular component, in which contact occurs with said material comprising chromium carbide in a melted condition, a local micro-fusion occurs, which creates said adhesion between the two components, internal and external, at a temperature advantageously comprised between about 1,450° C. and about 1,500° C.

BRIEF DESCRIPTION OF THE DRAWINGS

These and other characteristics of the present disclosure will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION

Figure 1:
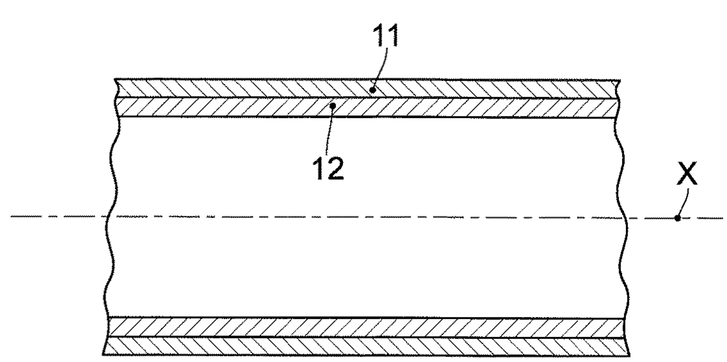
FIG. 1 is a schematic longitudinal section view of a tubular element according to the present disclosure.
Figure 2:
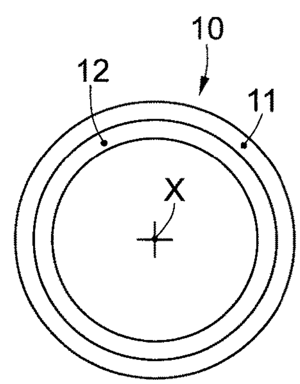
FIG. 2 is a front view of the tubular element of FIG. 1.

With reference to FIGS. 1 and 2, a tubular element 10 to convey abrasive materials, such as concrete, inert materials, or suchlike, according to the present disclosure, comprises an external tubular component 11 and an internal tubular component 12, coaxial to a central axis X. In particular, the internal tubular component 12 is substantially made with centrifugation technology, and with some new and inventive characteristics, which will be explained later in detail.

It should be noted that, although in the example provided here the central axis X is rectilinear, so that the tubular element 10 is cylindrical, the central axis X can also be curved, or comprise at least one curved segment, therefore the shape of the tubular element 10 can be curved, or comprise at least a curved toroidal part, although the two tubular components 11 and 12 remain coaxial to each other.

In this particular case, the external tubular component 11 is made of metal, for example steel, advantageously not tempered, while the internal tubular component 12 is made of pure chromium carbide, for example Cr3C2, Cr23C6, Cr7C2. It is also possible to use both an alloy or a mixture of chromium carbide called Cr HARD, which is practically a chromium white cast iron, and also Cr3C2-NiCr. According to the different supply techniques, the composition of the carbides can vary, also according to the base material used.

According to possible solutions, the internal tubular component 12 is made of a material resistant to wear, with a hardness higher than that of the external tubular component 11.

According to possible solutions, the material resistant to wear has a hardness greater than or equal to 66HRC.

Although the centrifugation technology to obtain tubular elements, or pipes, has already been known for a long time, the present disclosure proposes a new and very innovative solution, which provides to use, as a mold of the rotating centrifuge, the same external tubular component 11, made of steel, and to cast the material comprising chromium carbide in a melted condition inside it in order to produce the internal tubular component 12 and obtain the final product, that is, the tubular element 10, in a single step.

Figure 3:
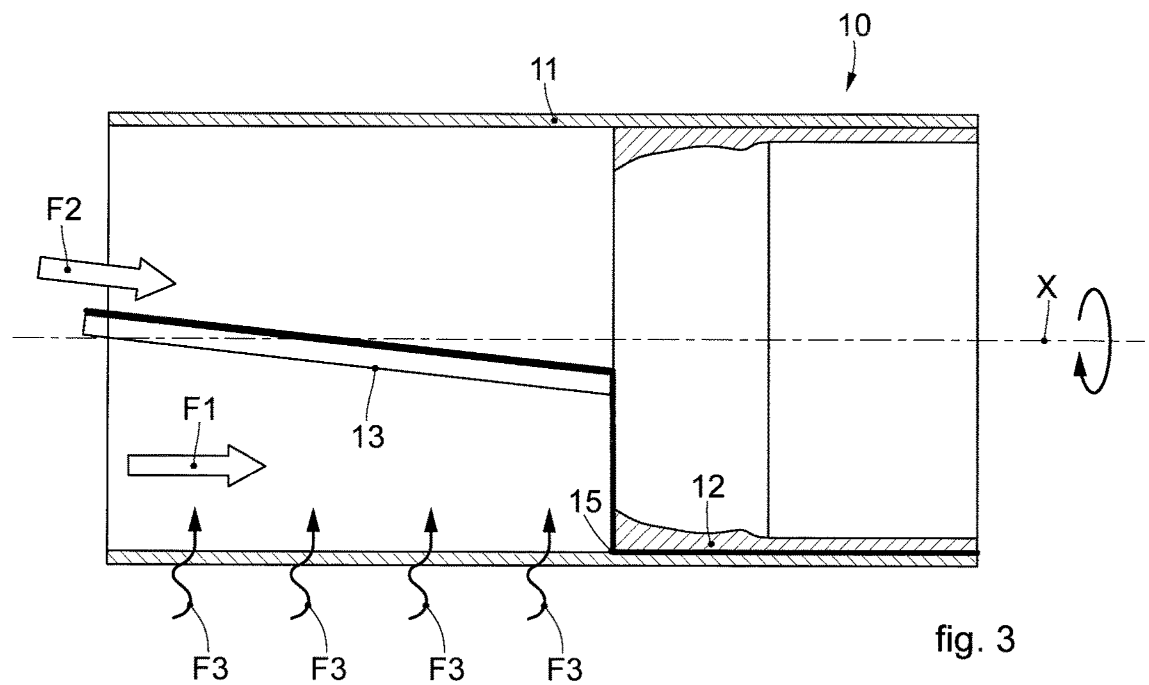
FIG. 3 is a schematic longitudinal section view on an enlarged scale of a step of the method to produce the tubular element of FIG. 1.

FIG. 3 shows schematically a functional diagram of the method to produce a tubular element 10.

The external tubular component 11 is both made to rotate at a high speed around the central axis X, for example at an angular speed W advantageously comprised between about 200 rpm and about 250 rpm, and also made to translate longitudinally, that is, parallel to the central axis X, as indicated by the arrow F1, for example at a translation speed V advantageously comprised between 7 m/min and about 11 m/min.

At the same time, by means of a chute 13 disposed inside the same external tubular component 11, a material comprising chromium carbide in a melted condition, coming from an external crucible, of the known type and not shown in the drawings, is cast onto the internal surface of the external tubular component 11, as indicated by the arrow F2. The temperature T1 of the material comprising chromium carbide at exit from the crucible is advantageously comprised between about 2,100° C. and about 2,200° C., while the temperature T2 of the material comprising chromium carbide when it comes into contact with the internal surface of the external tubular component 11 is advantageously comprised between about 1,950° C. and about 2,000° C.

Furthermore, in order to guarantee the correct compromise between the fluidity of the cast material, that is, of the chromium carbide, and the maintenance of the fluid state, and therefore guarantee the correct workability of the material, it is necessary to maintain the external tubular component 11 functioning as a mandrel at a given temperature T3, advantageously comprised between about 1,000° C. and about 1,100° C., during the whole step of the method. This is obtained by suitable heating devices, of a known type and not shown in the drawings, which radiate heat, as indicated by the arrows F3.

According to a variant, not shown in the drawings, but easily understandable for a person of skill in the art, the external tubular component 11 rotates, but does not translate longitudinally, while it is the chute 13 that is translated parallel to the central axis X toward the inside of the same external tubular component 11.

Figure 4:
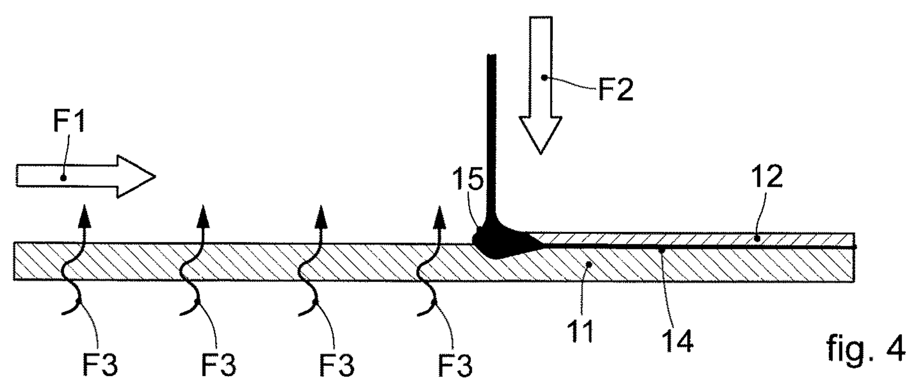
FIG. 4 is a detail of the step of the method of FIG. 3.

A method of this type allows the perfect adhesion of the two tubular components 11 and 12, since the internal tubular component 12 literally conforms to the external tubular component 11 according to the actual geometry of the latter. This is allowed by the presence of a thin interface layer 14 (FIG. 4) which is automatically created between the two tubular components 11 and 12 during the solidification of the chromium carbide. In fact, in a zone 15 of the external tubular component 11 made of steel, where contact with the chromium carbide in a melted condition occurs, a local micro-fusion occurs, at a temperature T4 advantageously comprised between about 1,450° C. and about 1,500° C.

The interface 14 between the two materials, that is, the steel and the chromium carbide, is characterized by the dispersion of the chromium carbide inside the metal external tubular component 11, for example made of steel, following the simultaneous co-fusion of the two materials.

With an external tubular component 11 having a thickness comprised between 1.5 mm and 2.0 mm, advantageously 1.8 mm, the interface 14 between the two materials guarantees the correct adhesion of the parts and its thickness is advantageously comprised between about 0.2 mm and about 0.4 mm.

The internal tubular component 12 made of chromium carbide is able to ensure a duration, that is, a resistance to wear, considerably higher than a known component in tempered steel. In fact, chromium carbide allows to reach higher levels of hardness compared to those of tempered steel, for example greater than or equal to 66HRC, compared to 63HRC of tempered steel.

The advantages of the present disclosure are many and at least the following.

The final product, that is, the tubular element 10, made using the method described above is much more economical than that obtained with known methods, since with the present disclosure it is possible to reduce manufacturing costs and times, as some operations have been eliminated, including the movement of the sub-parts and the flaring processes, which on the other hand are necessary in known methods.

Another advantage of the present disclosure is the repeatability of the method, which is decidedly greater than that of known methods and this provides a greater reliability and stability of the final product. In particular, the known method which provides both the flaring step and also the tempering step is instead affected by a whole series of uncertainties linked to the state of the semi-finished products, including the ovalization and the curvature of the components, which go to the detriment of the quality of the final product.

The productivity of the method according to the present disclosure is decidedly high; in fact, the method according to the present disclosure is of the continuous type, therefore it can be industrialized for decidedly significant volumes. On the other hand, the production of the tubular elements with known methods has significant productivity limits and must also deal with the stand-by steps and the constant presence of the operators.

Furthermore, the method according to the present disclosure can be completely automated, so that it also allows to reduce the physical presence of the operators, also with advantages in terms of safety.

Furthermore, the tubular element obtained with the method according to the present disclosure is advantageously suitable to withstand an internal working pressure, therefore continuous, typically equal to 85 bar.

It is clear that modifications and/or additions of parts may be made to the tubular element 10 to transport abrasive materials, in particular concrete, and to the method to produce it as described heretofore, without departing from the field and scope of the present disclosure.

It is also clear that, although the present disclosure has been described with reference to some specific examples, a person of skill in the art shall certainly be able to achieve many other equivalent forms of tubular elements to transport abrasive materials, and of the corresponding methods to produce them, having the characteristics as set forth in the claims and hence all coming within the field of protection defined thereby.

The invention claimed is:

1. A method to make a tubular element to transfer abrasive materials, comprising:

providing an external tubular component made of steel;

rotating the external tubular component around a central axis at a determinate angular speed;

simultaneously casting a material comprising chromium carbide, in a pure form or in the form of an alloy or mixture thereof, into said rotating external tubular component, in a melted condition in order to mold in-situ an internal tubular component;

wherein the internal tubular component is made of a material having a greater resistance to wear than that of the external tubular component, wherein said external and internal tubular components are formed coaxial to the central axis; and wherein the external tubular component delimits a centrifugal mold for molding the internal tubular component.

2. The method as in claim 1, wherein said material comprising chromium carbide is conveyed toward an internal surface of said external tubular component by distribution means, while a corresponding translation is made between said external tubular component and said distribution means in a direction parallel to said central axis.

3. The method as in claim 2, wherein said translation occurs at a determinate translation speed that is advantageously comprised between about 7 m/min and about 11 m/min.

4. The method as in claim 1, wherein said determinate angular speed is advantageously comprised between about 200 rpm and about 250 rpm.

5. The method as in claim 1, wherein the temperature of said material comprising chromium carbide, when it comes into contact with an internal surface of said external tubular component, is advantageously comprised between about 1,950° C. and about 2,000° C.

6. The method as in claim 1, wherein said external tubular component, at least during a first sub-step, is heated by external heating means so that it reaches and maintains a temperature advantageously comprised between about 1,000° C. and about 1,100° C.

7. The method as in claim 1, wherein in a zone of said external tubular component, in which the contact occurs with said material comprising chromium carbide in its melted condition, a local micro-fusion occurs, at a temperature advantageously comprised between about 1,450° C. and about 1,500° C.

8. The method as in claim 1, wherein during solidification of said chromium carbide, a thin interface layer is formed between said external tubular component and said internal tubular component.

9. The method as in claim 8, wherein the thickness of said interface layer is advantageously comprised between about 0.2 mm and about 0.4 mm.

10. The method as in claim 1, wherein the abrasive materials comprise at least one of concrete and inert materials.

* * * * *